Figure 1:
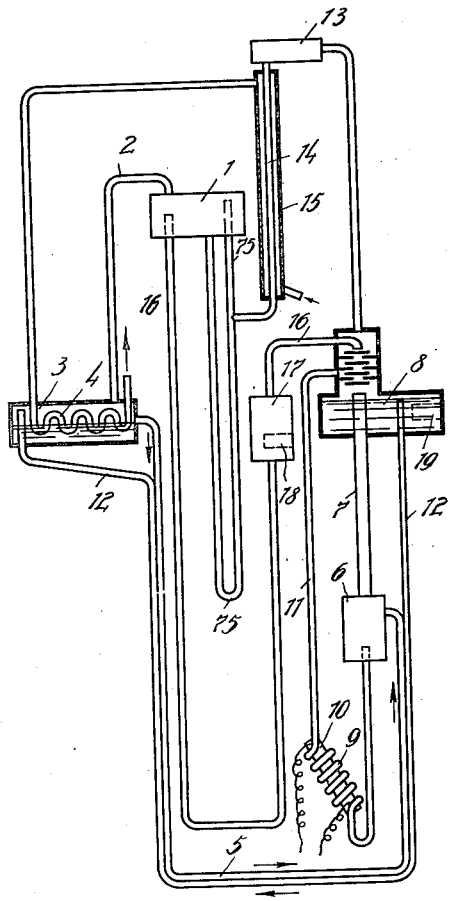

Sept. 20, 1932.  E. ALTENKIRCH  1,878,092
CONTINUOUS ABSORPTION REFRIGERATING APPARATUS
Filed Sept. 29, 1928   2 Sheets-Sheet 1

Inventor
Edmund Altenkirch
by Knight B
attorneys

Sept. 20, 1932. E. ALTENKIRCH 1,878,092
CONTINUOUS ABSORPTION REFRIGERATING APPARATUS
Filed Sept. 29, 1928 2 Sheets-Sheet 2

Inventor
Edmund Altenkirch
by Knight Bro
Attorneys

Patented Sept. 20, 1932

1,878,092

UNITED STATES PATENT OFFICE

EDMUND ALTENKIRCH, OF ALT-LANDSBERG-SUD, GERMANY, ASSIGNOR TO SIEMENS-SCHUCKERTWERKE AKTIENGESELLSCHAFT, OF BERLIN-SIEMENSSTADT, GERMANY, A CORPORATION OF GERMANY

CONTINUOUS ABSORPTION REFRIGERATING APPARATUS

Application filed September 29, 1928, Serial No. 309,262, and in Germany October 12, 1927.

My invention relates to improvements in continuous absorption refrigerating apparatus, and more specifically to machines of this type, in which all parts are in open communication with one another and in which the absorption solution is raised into a gas separation chamber located at a higher level by the expelled gas in an ascending pipe or riser. In connection with such apparatus it has been proposed to bring the gaseous working medium expelled from the absorption solution and mixed with vaporous solvent into heat exchange with a rich absorption solution coming from the absorber and contained in a rectifier located at a lower level than the gas separation chamber. The object of this procedure is to supply to the condenser a working medium in as dry a condition as possible, i. e. free from entrained vapors of the solvent, and at the same time to avoid an additional expenditure of heat for the rectification. It has also been suggested to improve the rectification in the heat exchange vessel located at a lower level by introducing into it besides the absorption solution coming from the absorber the quantities of liquid still quite rich in gas, which as unevaporated residues must be discharged from the evaporator and again returned into the absorber system.

Improvements of this character are disclosed in my copending application Serial No. 141,929, filed October 16, 1926, and of which the present application is a continuation in part.

My invention points the way to carry out a good rectification of the expelled gaseous working medium also in absorption apparatus of the first mentioned kind, which possess no rectification vessel located at a level lower than the gas separator chamber and in which the rich solution coming from the absorber can therefore not be used for the rectification. According to my invention this object is attained by conducting the excess liquid, which should be discharged from the evaporator, for the purpose of rectification of the expelled gaseous working medium into a vessel from which the liquid together with the impoverished absorption solution flows into the absorber. The rectification preferably may be carried out in the same chamber in which the expelled gaseous working medium and the absorption solution separate from each other, i. e. in the already mentioned gas separating chamber.

Various embodiments of my invention are illustrated in the drawings affixed hereto and forming part of my specification.

In the drawings

Figure 2:
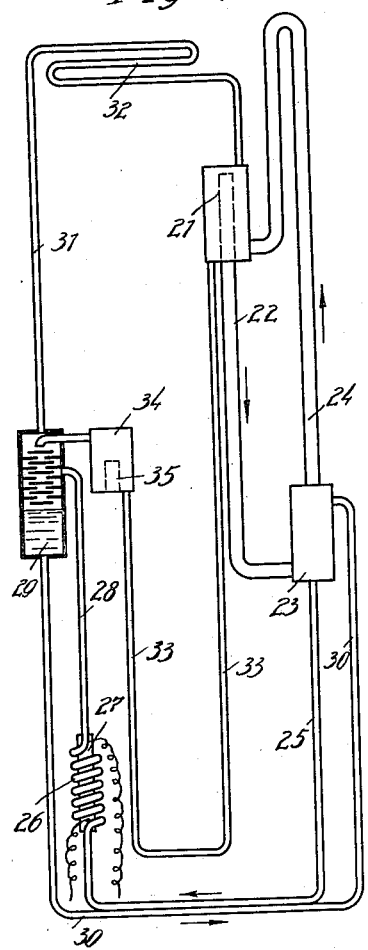
Figure 3:
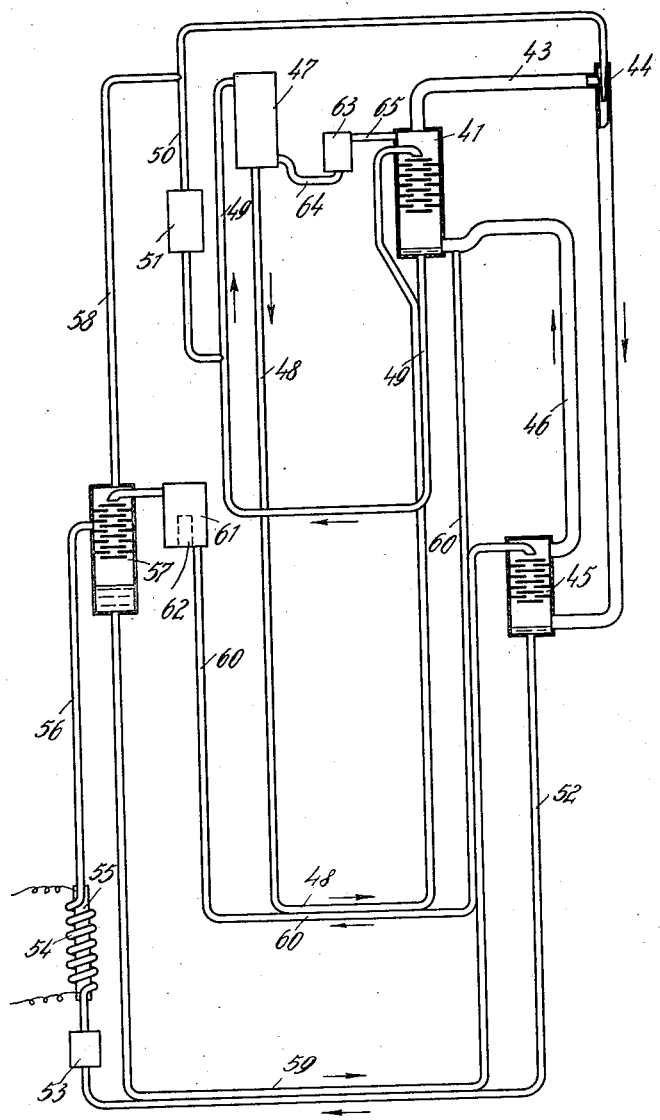

Fig. 1 shows the application of my invention to an absorption refrigerating apparatus with purely thermal action, in which the pressure difference is maintained merely by columns of liquid, Fig. 2, a high-pressure absorption apparatus, in which the gaseous refrigerating medium, such as ammonia, is mixed with a neutral, indifferent or non-absorbable gas, and Fig. 3, a refrigerating apparatus operating according to the re-absorption system, in which the circulation of an indifferent gas is effected by a jet nozzle.

Referring to Fig. 1 of the drawings, 1 is the evaporator from which the gaseous refrigerating medium passes through the pipe 2 into the absorber 3, which is cooled by cooling water traversing a cooling coil 4. From the absorber 3 the enriched solution flows through an U-shaped pipe 5 into an auxiliary or intermediate tank 6, which serves to render the circulation of the liquid more uniform. This auxiliary tank 6 is in communication with the gas separator 8 by a pipe 7. From the auxiliary tank 6 the solution passes into the lower end of the generator, still or expeller 9 designed as inclined coil, which is heated by an electric heating rod 10. In this generator and the adjoining riser 11 the heated and impoverished liquid is forced upwards by ascending bubbles and is discharged with the vapor bubbles into gas separator 8, which latter is in communication with the absorber 3 through a U-shaped tube 12. The impoverished solution collecting in separator 8 returns into the absorber 3 through the pipe 12, which in conjunction with the closely adjacently disposed pipe 5 forms a heat interchanging device. The gaseous refrigerant separated from the liquid in the gas separator 8 is conducted through a compensating tank 100

13 into the condenser 14, the cooling jacket of which is traversed by the same cooling water, which also traverses the cooling coil 4 of the absorber. The refrigerating medium condensed in the condenser 14 is conducted into the evaporator 1 through a pipe 75, which in order to maintain the pressure is designed a U-pipe, the second limb of which opens into the lower part of the evaporator 1.

The liquid refrigerant not evaporated in the evaporator 1, and which may have amounts of absorption liquid entrained in it collects in the evaporator. As soon as a considerable excess of liquid is present in the evaporator, this excess is able to escape from the evaporator through a U-shaped pipe 16 and to enter the upper part of the gas separator 8 through a tank 17 included in this pipe. The gas separator is provided with horizontal baffle plates over which this liquid trickles down in counterflow to the ascending gas. The cool liquid supplied to the gas separating chamber 8 through the pipe 16 enters into a heat interchange with the expelled gaseous working medium which may have certain amounts of vaporized solvent entrained, and effects the rectification of the vaporous refrigerant viz the condensation and separation of the also evaporated solvent and through heat interchange causes at the same time the evaporation of at least some of the liquid excess refrigerant supplied through pipe 16. The more of the solvent has been entrained into the condenser 14, the larger excessive quantities of the solvent pass into the rectification chamber of the gas separator 8 through the return pipe 16. In this way the amount of the entrained solvent is kept low at points of the system where it is not desired.

The tank 17 serves to prevent in the event of pressure fluctuations the return of the gas from the gas separating chamber 8 into the evaporator 1 or at least to render the return difficult In the tank 17 may be provided a heating cartridge 18, capable of evaporating part of the liquid in the tank 17, so that the bubbles passing with the remaining liquid into the ascending part of pipe 16 above tank 17, render it considerably easier for the liquid to rise to the desired level, than would be possible by the mere pressure difference between the evaporator 1 and the gas separator 8 at ordinary differences in level.

This heating device is, however, unnecessary for this purpose, if the evaporator is located so much above the gas separator, that the column of liquid by itself is already able to overcome the pressure difference.

For the purpose of regulating the concentration of the absorption liquid a heating cartridge 19 may also be provided in the gas separator 8.

Referring to Fig. 2 of the drawings showing a high pressure absorption machine in which a non-absorbable gas is admixed with the gaseous refrigerating agent it will be seen that the gaseous refrigerating agent, such as ammonia mixed with the lighter, neutral gas leaves the evaporator 21 through the pipe 22, which enters the lower part of the absorber 23. From the upper part of the absorber rises the gas mixture which is freed to a great extent from the refrigerating agent and has thus become lighter, through a bent pipe 24, the highest point of which is located above the gas outlet of the evaporator 21. The pipe 24 opens into the bottom part of the evaporator 21. The liquid enriched in the absorber passes through a pipe 25 into the generator, still or expeller formed by a vertical coil 26 heated by an electric heating rod 27. From here the liquid is conveyed into the gas separator 29 through the ascending pipe 28 by the gas bubbles forming in this pipe. From the gas separator a pipe 30 leads the impoverished absorption liquid back to the absorber 23 and on its way enters into a heat exchange with the cooler enriched liquid flowing in after the already mentioned pipe 25. The gaseous refrigerating agent separated in the gas separator 29 and dried in its rectification chamber passes through a pipe 31 into the condenser 32 and is there condensed.

The condensate enters the evaporator 21 at the top. The evaporator 21 is in communication with the rectification chamber of the gas separator 29 by a U-shaped pipe 33. In the rising portion of the pipe 33 is included a tank 34, the liquid contents of which may, if desired, be heated by a heating cartridge 35.

The mode of operation of the apparatus just described is identical with that of the apparatus illustrated in Fig. 1 of the drawings. Excess liquid collecting in the evaporator 21 passes through the return pipe 33 into the tank 34 and hence into the gas separator 29, where it effects the drying of the gas.

Referring to Fig. 3 of the drawings showing diagrammatically a refrigerating machine operating according to the re-absorption principle, and in which the circulation of an indifferent gas is brought about by a vapor jet, it will be seen, that the vaporous refrigerant delivered from the gas separator 57 through pipe 58 to nozzle 44 disposed in pipe 43, in issuing from the nozzle, effects the circulation of the neutral and refrigerant gas mixture in pipe 43 coming from the evaporator 41. The gas mixture enters the lower part of the absorber 45 from the top of which the gas mixture poor in refrigerating agent returns to the evaporator 41 through the pipe 46. The portion of the pipe 46 opening into the lower part of the evaporator 41 is so shaped, that the passage of liquid, contained in the evaporator into the absorber through this pipe is prevented. The liquid refrigerating agent necessary for charging the evaporator 41 flows from the re-absorber 47 into the evaporator through a U-shaped pipe 48.

The impoverished refrigerating liquid returns to the reabsorber 47 through a pipe 49, which, in running part way closely adjacent to pipe 48 which carries cool gas-enriched absorption liquid, forms a heat exchanging device. Into the rising portion of the pipe 49 opens a gaseous refrigerant carrying pipe 50 containing a pressure maintaining tank 51. This pipe 50 receives the gaseous refrigerant directly from gas separator 57 through pipe 58 from which it is branched off. The gas diverted to the re-absorber 47 through pipe 50 effects the raising of the liquid from the evaporator 41 into the re-absorber. From the lower part of the absorber 45 the enriched refrigerating liquid passes through a pipe 52 and an equalizing tank 53 into the expeller 54 designed as vertical coil, which is heated by an electrically heated rod 55. The liquid is conveyed into the gas separator chamber 57 through an ascending pipe 56 by the action of the gas bubbles developed in said pipe. The top of chamber 57 is connected by a pipe 58 to the aforementioned nozzle 44 for the purpose stated hereinbefore. From the gas separator 57 the impoverished liquid is returned to the absorber 45 through a pipe 59, partway located closely adjacent to pipe 52 which carries cool enriched absorption liquid, thereby forming a heat exchanger.

From the tube 46, returning the gas mixture lean in vaporous refrigerant to the evaporator, is branched off a U-shaped pipe 60, close to the point where pipe 46 enters evaporator 41. The left hand shank of this pipe 60 leads through a tank 61 into the rectification chamber of the gas separator 57. Pipe 60 and tank 61, the liquid contents of which latter may be heated from outside by a heating cartridge 62, serves for the return of excessive quantities of liquid, which have collected in the evaporator 41, into the gas separator 57, where they are utilized for drying the separated gas or vapor, as described before.

Between the re-absorber 47 and the evaporator 41 is provided a venting device 63, 64, 65, which permits quantities of non-absorbable gas entrained into the re-absorber 47 to return into the gas circulating system.

The main advantage of the apparatus described is, that excess liquid (working agents or solvents) is removed from that part of the absorption system, where its collection has a detrimental effect, and is utilized in other parts of the system, such as in the gas separating chamber, where it is capable of separating evaporated solvent from the vaporous refrigerant, while simultaneously through heat exchange refrigerant vapor is developed from the returned liquid, all without further input of heat. In this way an automatic regulation is attained and the amount of entrained solvent in undesired parts of the system remains comparatively small and varies only within narrow limits.

Various modifications and changes may be made without departing from the spirit and the scope of the invention.

I claim as my invention:

1. In a continuous absorption refrigerating apparatus, in combination, a pipe system for circulating absorption liquid and containing an absorber, an expeller, a condenser, and an evaporator, all in open communication with one another, a rectifying vessel constructed to free the expelled refrigerant vapor from admixed vaporous absorption liquid, a pipe connected to said evaporator for draining excess amounts of liquid collecting therein, said pipe being disposed to drain said excess liquid into said rectifying vessel to cause the rectification of the expelled refrigerant by said excess liquid, said rectifying vessel being arranged at a point in the circulating system of the absorption liquid which permits the mixture of said excess liquid with the impoverished absorption liquid on its way to the absorber.

2. In a continuous absorption refrigerating apparatus, in combination, a pipe system for circulating absorption liquid and containing an absorber, an expeller, a condenser and an evaporator, all in open communication with one another, a gas separator for separating the absorption liquid from the expelled vaporous refrigerant, and a pipe connected to said evaporator and adapted to drain excess amounts of liquid collecting therein, said pipe being connected to drain said excess liquid into the gas chamber of said separator to rectify the separated gaseous refrigerant by said excess liquid.

3. In a continuous absorption refrigerating apparatus, in combination, a pipe system for circulating absorption liquid and containing an absorber, an expeller, a condenser and an evaporator, all in open communication with one another, a gas separator for separating the absorption liquid from the expelled vaporous refrigerant, and a pipe connected to said evaporator and adapted to drain excess amounts of liquid collecting therein, said pipe being connected to drain said excess liquid into the gas chamber of said separator to rectify the separated gaseous refrigerant by said excess liquid, the point at which said drain pipe connects with said evaporator being located at least so high above the point at which said pipe connects with said gas chamber, that the difference in pressure existing between the evaporator and the gas chamber is overcome by the weight of the liquid column in said drain pipe.

4. In a continuous absorption refrigerating apparatus, in combination, a pipe system for circulating absorption liquid and containing an absorber, an expeller, a condenser and an evaporator, all in open communication with one another, a gas separator for separating the absorption liquid from the expeller vaporous refrigerant, and a pipe connected to said evaporator and adapted to drain excess amounts of liquid collecting therein, said pipe being connected to drain said excess liquid into the gas chamber of said separator to rectify the separated gaseous refrigerant by said excess liquid, the point at which said drain pipe connects with said evaporator being located at least so high above the point at which said pipe connects with said gas chamber, that the difference in pressure existing between the evaporator and the gas chamber is overcome by the weight of the liquid column in said drain pipe, said drain pipe being arranged in heat exchanging relation with the section of the pipe system, which conveys condensed refrigerant into the evaporator.

5. In a continuous absorption refrigerating apparatus, in combination, a pipe system for circulating absorption liquid and containing an absorber, an expeller, a condenser and an evaporator, all in open communication with one another, a gas separator for separating the absorption liquid from the expelled vaporous refrigerant, and a pipe connected to said evaporator and adapted to drain excess amounts of liquid collecting therein, said pipe being connected to drain said excess liquid into the gas chamber of said separator to rectify the separated gaseous refrigerant by said excess liquid, the point at which said drain pipe connects with said evaporator being located at least so high above the point at which said pipe connects with said gas chamber, that the difference in pressure existing between the evaporator and the gas chamber is overcome by the weight of the liquid column in said drain pipe, said drain pipe being arranged in heat exchanging relation with the section of the pipe system, which conveys absorption liquid from said gas separator to said absorber.

6. In a continuous absorption refrigerating apparatus, in combination, a pipe system for circulating absorption liquid and containing an absorber, an expeller, a condenser, and an evaporator, all in open communication with one another, a gas separator for separating the absorption liquid from the expelled vaporous refrigerant, and a pipe connected to said evaporator and adapted to drain excess amounts of liquid collecting therein, said pipe being connected to drain said excess liquid into the gas chamber of said separator to rectify the separated gaseous refrigerant by said excess liquid, the point at which said drain pipe connects with said evaporator being located at least so high above the point at which said pipe connects with said gas chamber, that the difference in pressure existing between the evaporator and the gas chamber is overcome by the weight of the liquid column in said drain pipe, said drain pipe containing a storage reservoir and being shaped to form a liquid seal between the evaporator and said gas chamber for preventing the passage of gas from said gas chamber into said evaporator.

7. In absorption refrigerating apparatus, the combination of a boiler wherein ammonia vapor is expelled from a solution of ammonia and water together with vapor of some of the water, means for changing the expelled ammonia vapor to a condensed fluid phase, an evaporator wherein the ammonia may evaporate to produce cooling effect, an absorber for causing the evaporated ammonia to be absorbed in the water and returned to the boiler and means for causing the solution of ammonia and water which collects in the evaporator to pass into heat exchange relation with the ammonia vapor being expelled from the boiler to dry the expelled ammonia vapor.

8. In absorption refrigerating apparatus, the combination of a boiler wherein ammonia vapor is expelled from a solution of ammonia and water together with vapor of some of the water, means for changing the expelled ammonia vapor to a condensed fluid phase, an evaporator wherein the ammonia may evaporate to produce cooling effect, an absorber for causing the evaporated ammonia to be absorbed in the water and returned to the boiler, means for draining the solution of ammonia and water which collects in the evaporator back into the boiler-absorber system by gravity flow and means for causing said solution to take up heat from the ammonia vapor being expelled from the boiler to dry the expelled ammonia.

9. In absorption refrigerating apparatus, the combination of a boiler wherein refrigerant vapor is expelled from an absorption liquid together with vapor of some of said liquid, means for changing the expelled refrigerant to a condensed fluid phase, an evaporator wherein the refrigerant may evaporate to produce cooling effect, an absorber for causing the evaporated refrigerant to be absorbed in the liquid and returned to the boiler and means for causing liquid which collects in said evaporator to pass in heat exchange relation with the vapors being expelled from the boiler to promote condensation of the absorption liquid vapor mixed with the refrigerant vapor.

10. In absorption refrigerating apparatus, the combination of a boiler wherein refrigerant vapor is expelled from an absorption liquid together with vapor of some of said liquid, means for changing the expelled refrigerant to a condensed fluid phase, an evaporator wherein the refrigerant may evaporate to produce cooling effect, an absorber for causing the evaporated refrigerant to be absorbed in the liquid and returned to the boiler and means for causing liquid which collects in said evaporator to pass into direct and intimate contact with the vapors being expelled from said boiler to facilitate removal of the vapors of said absorption liquid from said refrigerant vapor.

11. In absorption refrigerating apparatus, the combination of a boiler wherein refrigerant vapor is expelled from an absorption liquid together with vapor of some of said liquid, means for changing the expelled refrigerant to a condensed fluid phase, an evaporator wherein the refrigerant may evaporate to produce cooling effect, an absorber for causing the evaporated refrigerant to be absorbed in the liquid and returned to the boiler and means for causing liquid which collects in said evaporator to flow by gravity back into the boiler-absorber system after having passed in heat exchange relation with the vapors being expelled from said boiler.

12. Apparatus for increasing the efficiency of an absorption refrigerating system having a boiler, an absorber, a device for changing a refrigerant vapor to a condensed fluid phase and an evaporator, said apparatus including means for draining excess absorption liquid from the evaporator into the boiler and means for causing an exchange of heat between said excess liquid and vapors being expelled from the boiler.

13. Apparatus for increasing the efficiency of an absorption refrigerating system having a boiler, an absorber, a device for changing a refrigerant vapor to a condensed fluid phase and an evaporator, said apparatus including means for draining excess absorption liquid from the evaporator into the boiler and means for causing said excess liquid to pass into direct and intimate contact with vapors being expelled from the boiler.

14. The method of increasing the efficiency of an absorption refrigerating system having a boiler wherein a refrigerant is vaporized together with some of the absorption liquid, an absorber, a device for changing a refrigerant vapor to a condensed fluid phase and an evaporator, said method consisting of conveying excess absorption liquid which collects in the evaporator back into the boiler and causing said excess liquid to take up heat from the vapors being expelled from the boiler to remove a portion of the absorption liquid vapor therefrom.

15. The method of increasing the efficiency of an absorption refrigerating system having a boiler wherein a refrigerant is vaporized together with some of the absorption liquid, an absorber, a device for changing a refrigerant vapor to a liquid phase, and an evaporator, said method consisting of removing excess absorption liquid from the evaporator, conveying it into the presence of the vapors being expelled from the boiler and then returning it into the boiler.

16. The method of increasing the efficiency of an absorption refrigerating system having a boiler wherein a refrigerant is vaporized together with some of the absorption liquid, an absorber, a device for changing a refrigerant vapor to a liquid phase and an evaporator, said method consisting of removing excess absorption liquid from the evaporator and causing it to flow by gravity into the presence of vapors being expelled from the boiler to remove a portion of the absorption liquid vapor therefrom.

In testimony whereof I affix my signature.

EDMUND ALTENKIRCH.